(12) United States Patent
Yamashita et al.

(10) Patent No.: US 6,515,998 B1
(45) Date of Patent: Feb. 4, 2003

(54) TABLE DATA RETRIEVING APPARATUS RETRIEVING TABLE IN WHICH REFERENCE DATA IS STORED BY USING RETRIEVAL KEY

(75) Inventors: Mikiharu Yamashita, Tokyo (JP); Tatsuhiko Amagai, Tokyo (JP); Tatsuo Aramizu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/441,088

(22) Filed: Nov. 16, 1999

(30) Foreign Application Priority Data

Dec. 4, 1998 (JP) .............................. 10-345150

(51) Int. Cl.[7] .............................................. H04L 12/56
(52) U.S. Cl. ...................... 370/401; 370/412; 707/102
(58) Field of Search ........................... 370/395.31, 401, 370/463, 412, 471, 389, 392, 352, 353, 354, 355, 363; 707/102, 509

(56) References Cited

U.S. PATENT DOCUMENTS

| 5,644,571 | A | * | 7/1997 | Seaman |
| 5,701,300 | A | * | 12/1997 | Jeon |
| 5,732,078 | A | * | 3/1998 | Arango |
| 5,917,821 | A | * | 6/1999 | Gobuyan |
| 5,938,736 | A | * | 8/1999 | Muller |
| 5,951,649 | A | * | 9/1999 | Dobbins |
| 6,069,895 | A | * | 5/2000 | Ayandeh |
| 6,084,877 | A | * | 7/2000 | Egbert |
| 6,130,891 | A | * | 11/2000 | Lam |
| 6,145,045 | A | * | 11/2000 | Falik |
| 6,370,147 | B1 | * | 4/2002 | Beser |

FOREIGN PATENT DOCUMENTS

| JP | 63-29881 | 2/1988 |
| JP | 2-148174 | 6/1990 |
| JP | 5-46598 | 2/1993 |
| JP | 6-69928 | 3/1994 |
| JP | 6-261078 | 9/1994 |
| JP | 8-223207 | 8/1996 |
| JP | 9-107377 | 4/1997 |
| JP | 2000-151709 | 5/2000 |

* cited by examiner

Primary Examiner—Ricky Ngo
Assistant Examiner—Kamran Emdadi
(74) Attorney, Agent, or Firm—Sughrue Mion, PLLC

(57) ABSTRACT

A table data retrieving apparatus comprises a plurality of tables in which a reference data is stored. Each table of said plurality of tables is allocated into any group of a plurality of groups. A management table stores a priority of said table. A data retrieving section selects a group based on the retrieving key by which the reference data is selected. The data retrieving section retrieves with the priority said table which is allocated into the selected group is stored.

13 Claims, 6 Drawing Sheets

Fig. 4

|        | 1st    | 2nd    | 3rd    | 4th    |
|--------|--------|--------|--------|--------|
| GROUP1 | TABLE3 | TABLE1 | TABLE2 | TABLE4 |
| GROUP2 | TABLE2 | —      | —      | —      |
| GROUP3 | TABLE2 | —      | —      | —      |
| GROUP4 | TABLE1 | TABLE4 | TABLE2 | TABLE3 |

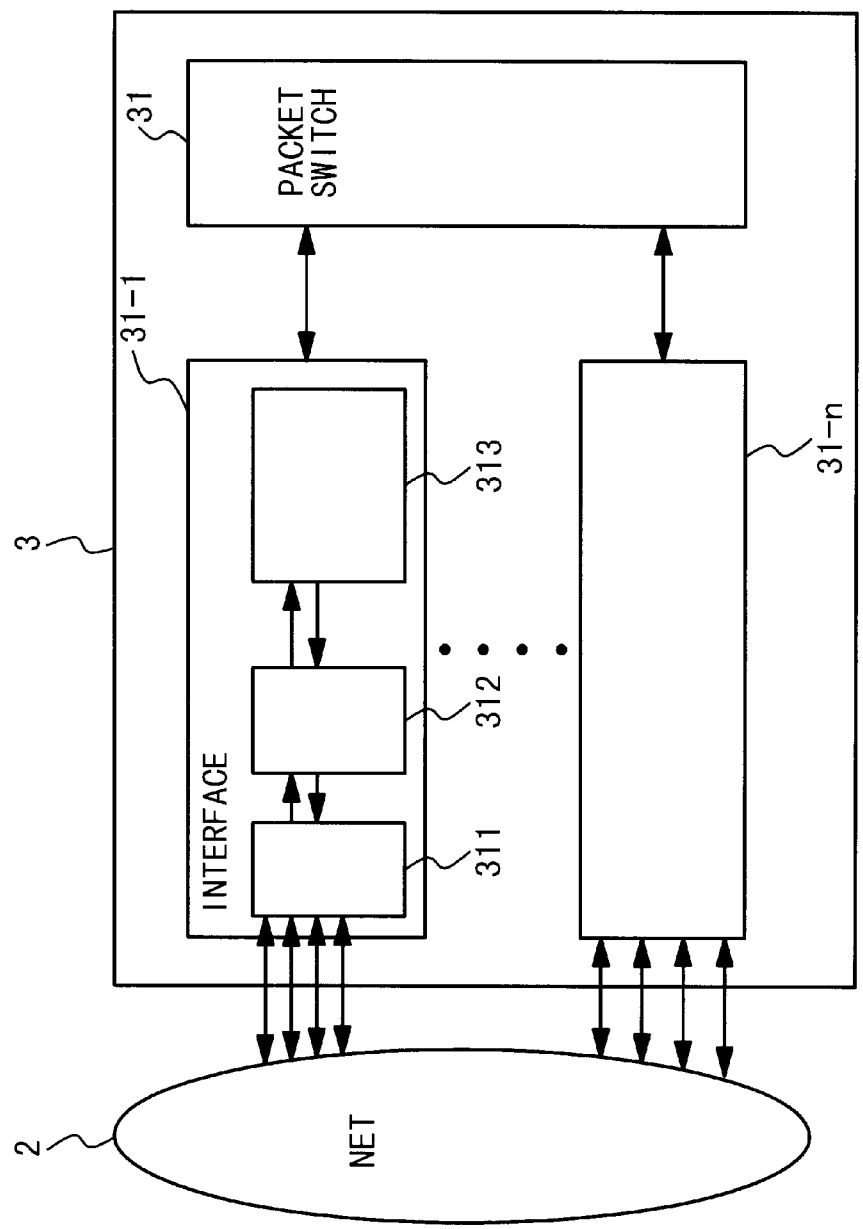

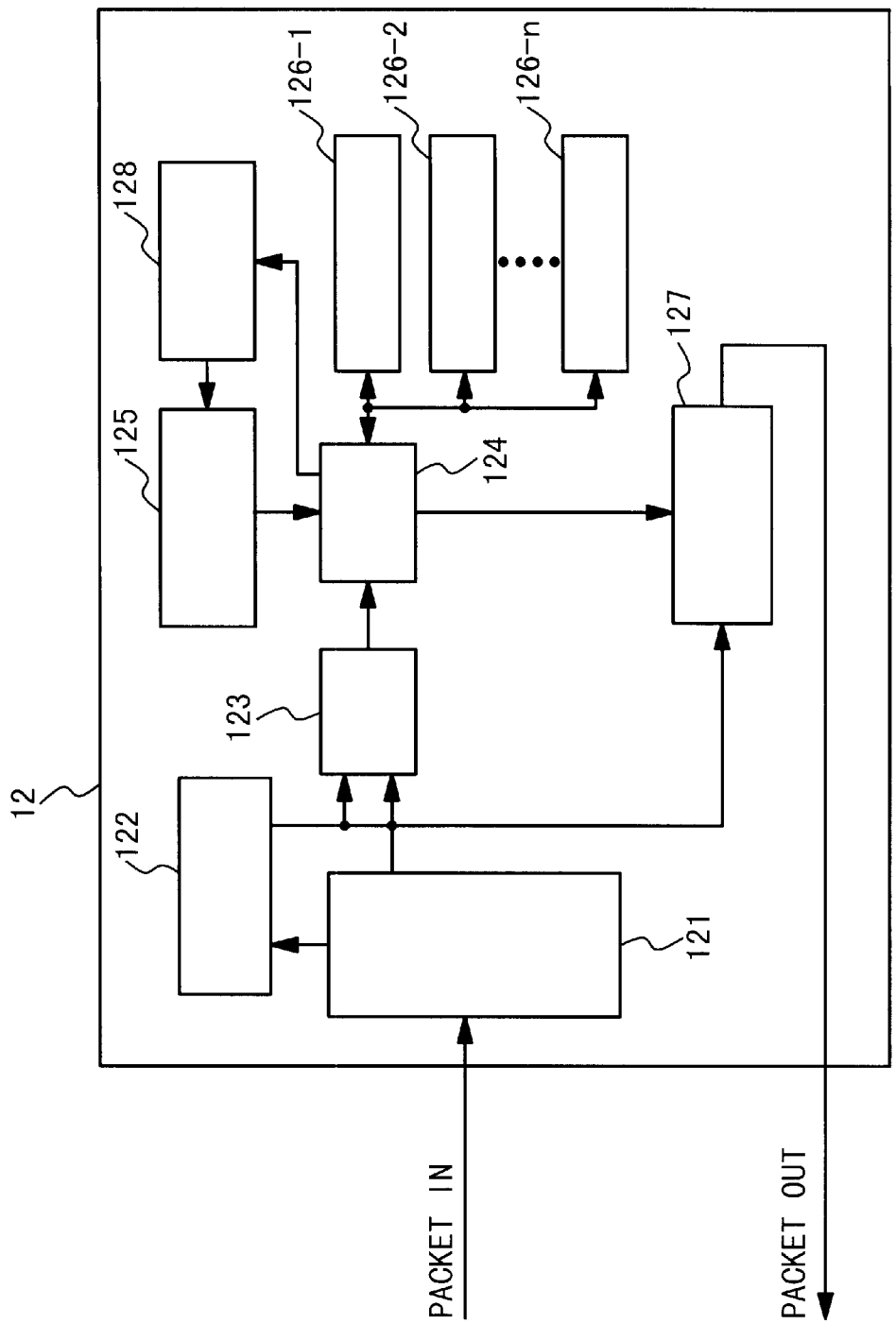

TABLE DATA RETRIEVING APPARATUS RETRIEVING TABLE IN WHICH REFERENCE DATA IS STORED BY USING RETRIEVAL KEY

BACKGROUND OF THE INVENTION

1. Field of the Invention

The present invention relates to a table data retrieving apparatus retrieving a table by using a retrieval key.

2. Description of the Related Art

A router is used when a plurality of communication networks is connected to each other. The router has a table storing a reference data indicative of a communication route. The table is referred when specifying a transfer destination of an IP packet. An address is set at a destination address portion of the IP packet. The table is retrieved by using the address as a retrieval key. The reference data is specified as the retrieved result. The reference data is used as an address of specifying a transfer destination of a packet. A content of the table can be updated. If a communication protocol is TCP/IP (Transmission Control Protocol/Internet Protocol), the content of the table is updated on the basis of information collected through BGP (Border Gateway Protocol) or RIP (Routing Information Protocol) that is a routing protocol.

The router corresponds to many kinds of line interfaces (communication protocols). The router accommodates a large number of lines. The router retrieves a communication route table when the packet is transferred. The router obtains an information of the transfer destination from the communication route table. Increases of the number of line interfaces and the number of accommodation lines cause the registration number of communication route tables to be increased. The increase of the registration number of communication route tables causes a retrieval time of the communication route table to be increased. The increase of the retrieval time causes a throughput of the router to be dropped.

Technique with regard to a process of retrieving a table of a router is disclosed in Japanese Laid Open Patent Application (JP-A Heisei 6-69928), Japanese Laid Open Patent Application (JP-A Heisei 6-261078), Japanese Laid Open Patent Application (JP-A Heisei 8-223207) and Japanese Laid Open Patent Application (JP-A-Heisei 9-107377). These documents disclose a technique reducing a table targeted by retrieval. These documents disclose a technique improving a response speed of a retrieval result.

SUMMARY OF THE INVENTION

Therefore, an object of the present invention is to provide a retrieving system making a retrieval of a table effective and making a table data retrieving process in a routing process faster, and a router having the retrieving system.

In order to achieve an aspect of the present invention, a table data retrieving apparatus includes a plurality of tables in each of which a reference data is stored. Each of the plurality of tables is allocated into one or more groups of a plurality of groups. A management table stores a priority of the each table. A data retrieving section selects one of the plurality of groups based on a retrieving key by which the reference data is selected. A data retrieving section retrieves the allocated table with the highest priority from the selected group.

In the above, a table data retrieving apparatus further includes a counter counting a retrieving hit-value when the data retrieving section retrieves the table. The data retrieving section changing the priority of the each table based on the retrieving hit-value.

In order to achieve another aspect of the present invention, a router includes a communication interface connected with a plurality of communication lines for transmitting communication data. The router further includes a plurality of tables storing transmission addresses of the communication data, each table of the plurality of tables is allocated into any group of a plurality of groups. The router further includes a management table storing a priority data of the each table. An address retrieving section selecting a group based on the retrieving key for selecting the reference data as a selected group. An address retrieving section retrieving the table with the priority from a selected group.

Also, the selected group corresponds with one of the plurality of communication lines.

In order to achieve an aspect of the invention, the router further includes a packet receiver receiving packets as the communication data each of which has a group discrimination flag for discriminating the any group and a destination address for transmitting any packet of the packets. The router includes a routing controller discriminating a receiver of the destination address from the received packet.

In the above, the address retrieving section selecting the any group based on the group destination flag of the any packet and retrieving the selected retrieved table based on the destination address of the any packet.

In the above, the routing controller replaces the destination address by the transmission address which is read from the retrieved table. The communication interface includes a terminator for terminating the communication data. The communication interface includes a flag setting section setting the group destination flag into the communication data for transmission.

In the above, the routing controller includes a counter for counting a hit-value of the retrieved table. The routing controller changes the priority of the retrieved table based on the hit-value.

In the above, the communication data is a packet having a plurality of cells.

In order to achieve an aspect of the invention, a method of retrieving table data includes allocating a plurality of tables into any group of a plurality of groups, each table having a reference data. The router providing a management table having a priority of each of the plurality of tables. The router retrieving a retrieved group from the plurality of groups based on a retrieving key for retrieving the reference data of a target table of one of the plurality of tables.

In the above, the router retrieving the target table with the priority from the retrieved group based on the retrieving key. The router further comprises counting the hit-value of the retrieved table. The router changing the priority of the retrieved table based on the hit-value.

In the above, the router further includes receiving communication data which has a group discrimination flag for discriminating the any group. The router includes destination address for transmitting the communication data.

In the above, the router further includes discriminating the retrieving group based on the group discrimination flag.

In the above, the router further includes providing transmission addresses of the communication data into the plurality of tables. The router discriminating a transmission address from the transmission address based on the retrieving key as a discriminated transmission address. The router replacing the destination address of the communication data by the discriminated transmission address.

A router according to the present invention has a plurality of grouped tables. A priority of the table within the group is indicated by a retrieval order management table. The grouping of the tables is carried out in accordance with a line, a line group, a logical line (for example, VPI/VCI (Virtual Path Identifier/Virtual Channel Identifier) of ATM and a data link connection identifier DLCI of a frame relay) and a logical line group.

A process of retrieving a transfer destination of a traffic is made faster if a priority is set in accordance with a reference frequency (hit rate).

When tables are grouped, one table is allocated into one group. This allocation enables an access of a special table (virtual private network) through general information (group information).

BRIEF DESCRIPTION OF THE DRAWINGS

FIG. 4 shows a configuration of a retrieval order management table according to the present invention;

FIG. 5 shows another configuration of a router according to the present invention; and FIG. 6 shows another configuration of a routing processor according to the present invention.

DESCRIPTION OF THE PREFERRED EMBODIMENTS

Figure 1:
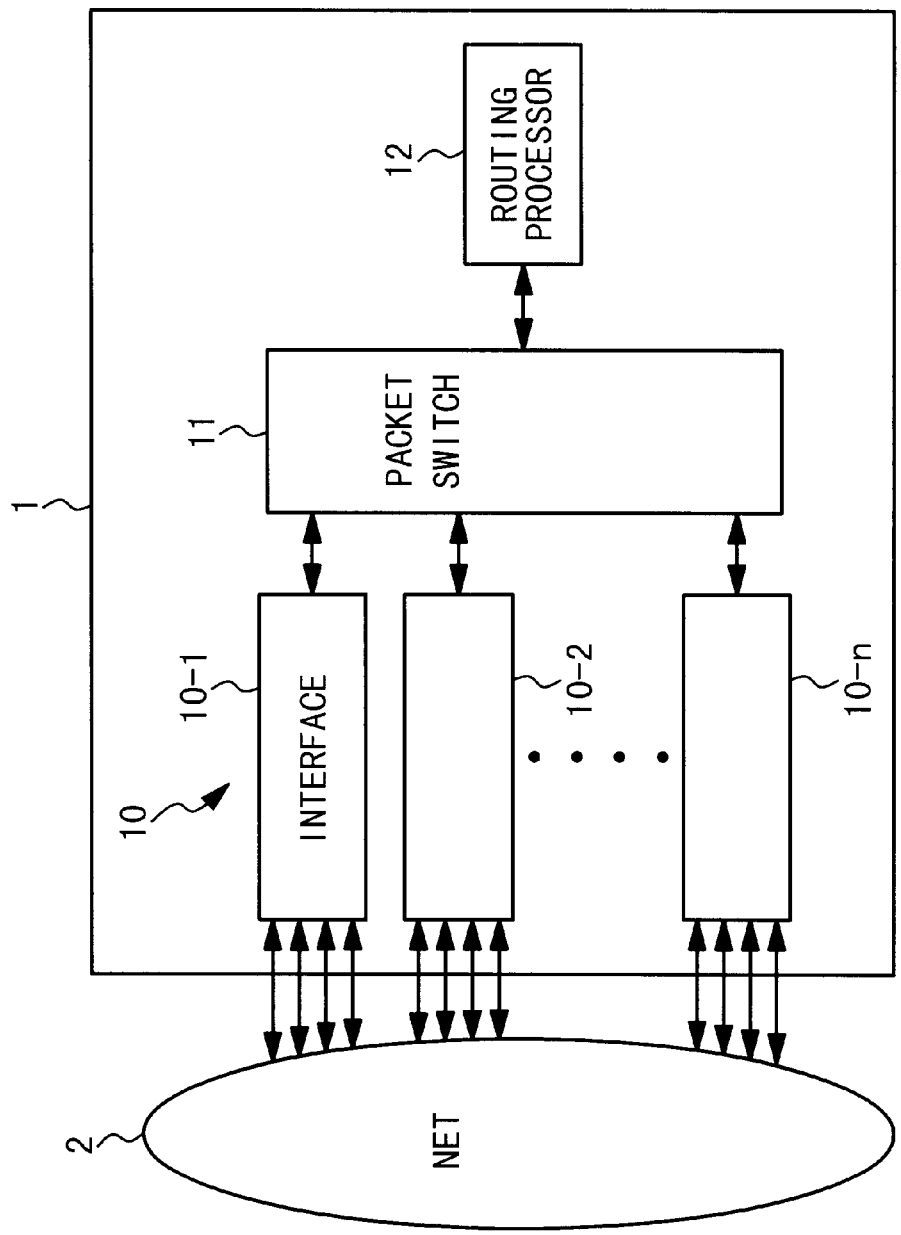
FIG. 1 shows a configuration of a router according to the present invention.

FIG. 1 shows a configuration of a router according to the present invention. A router 1 shown in FIG. 1 is provided with a line interface section 10 (10-1 to 10-n), a packet switch 11 and a routing processor 12.

The line interface sections 10-1 to 10-n are connected to a network 2. The line interface sections 10-1 to 10-n are connected to the packet switch 11. The packet switch 11 is connected to the routing processor 12.

The network 2 is a communication network to carry out a communication in accordance with IP. A transmission element constituting the network 2 is Ethernet, ATM (Asynchronous Transfer Mode) or a frame relay.

The packet switch 11 specifies a port from which a packet is sent out, in accordance with a routing flag. The port implies an input/output section of the packet switch 11. The routing processor 12 specifies a transfer destination corresponding to a destination address of a reception packet. The routing processor 12 adds a routing flag corresponding to the destination address to the reception packet. The routing processor 12 sends out the reception packet to which the routing flag is added, to the packet switch 11.

Figure 2:
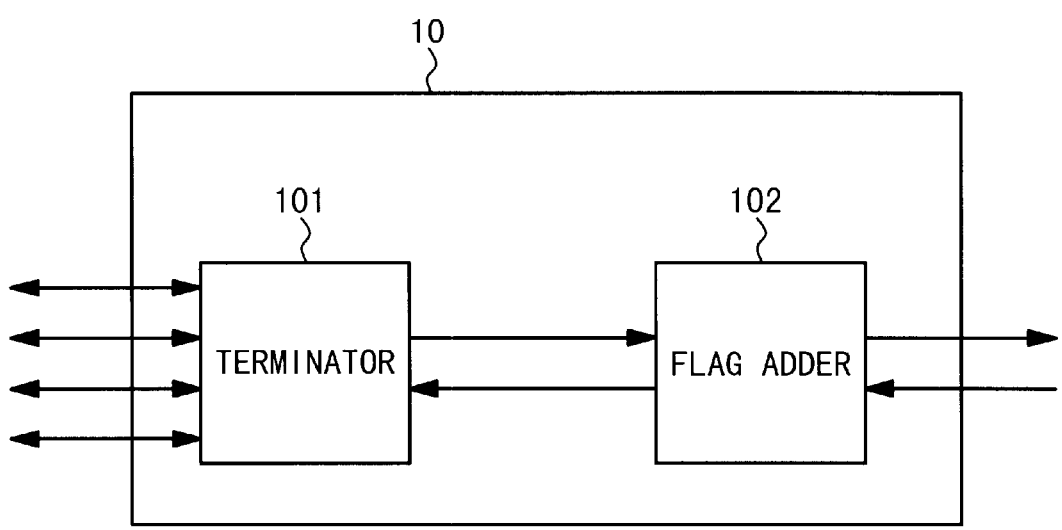
FIG. 2 shows a configuration of a line interface section according to the present invention.

FIG. 2 shows a configuration of the line interface section according to the present invention. The line interface section 10 shown in FIG. 2 is composed of a line end 101 and a flag add unit 102.

The line end 101 is connected to the network 2 (FIG. 1). The flag add unit 102 is connected to the packet switch 11 (FIG. 1).

The line end 101 is an end of a physical layer (a side of the network 2). The line end 101 is a communication circuit controlling a data transmission and reception to and from the network 2. The flag add unit 102 adds a group identification flag and a routing flag to the reception packet.

Figure 3:
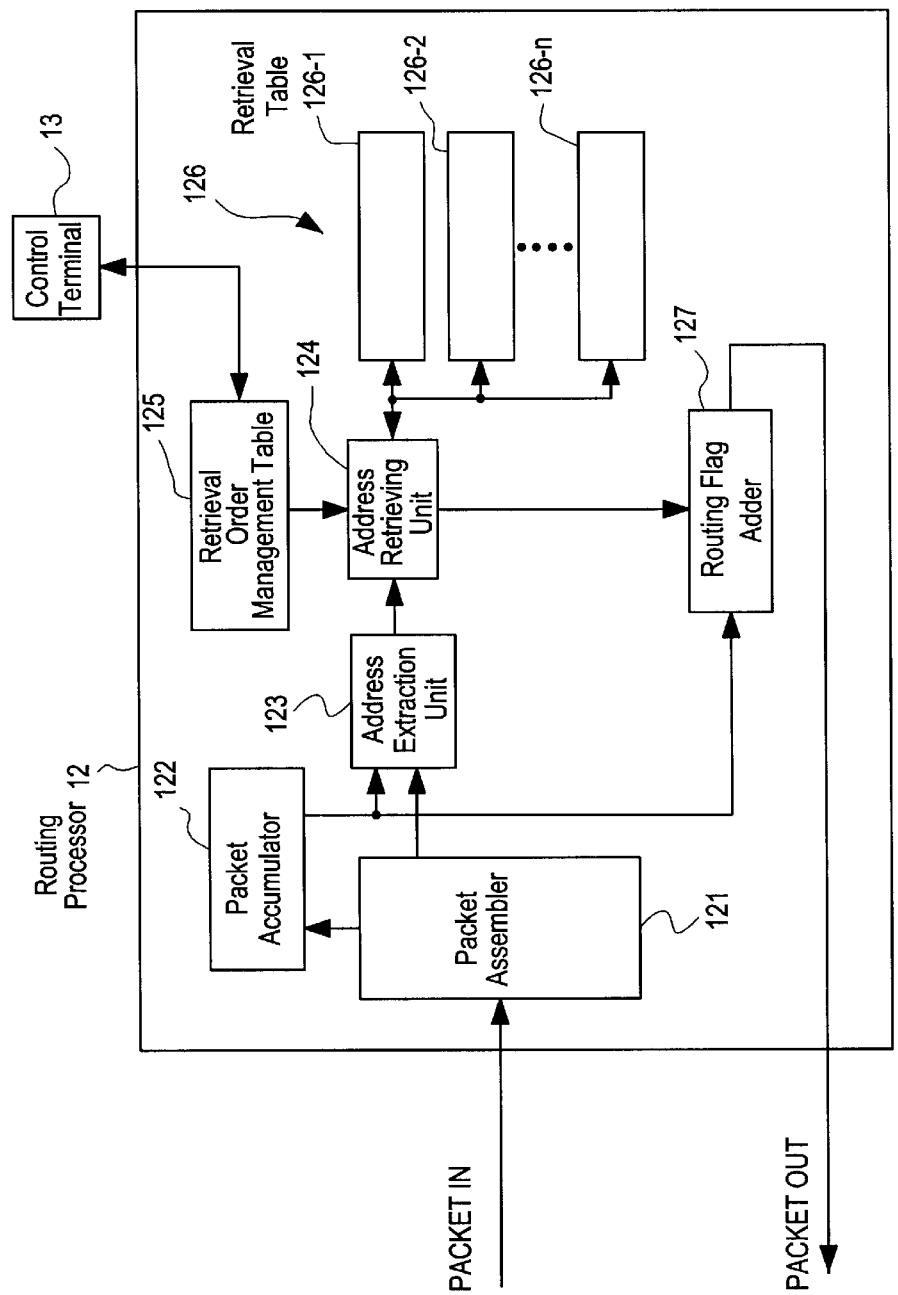
FIG. 3 shows a configuration of a routing processor according to the present invention.

FIG. 3 shows a configuration of the routing processor according to the present invention. The routing processor shown in FIG. 3 is composed of a packet assembler 121, a packet accumulator 122, an address extracting unit 123, an address retrieving unit 124, a retrieval order management table 125, a retrieval table 126 (126-1 to 126-n) and a routing flag adder 127.

The packet assembler 121 is connected to the packet accumulator 122. The packet assembler 121 is connected to the address extracting unit 123. The packet accumulator 122 is connected to the address extracting unit 123. The packet accumulator 122 is connected to the routing flag adder 127. The address extracting unit 123 is connected to the address retrieving unit 124. The address retrieving unit 124 is connected to the retrieval order management table 125. The address retrieving unit 124 is connected to the retrieval table 126. The address retrieving unit 124 is connected to the routing flag adder 127.

The packet assembler 121 is connected to the packet switch 11 (FIG. 1). The routing flag adder 127 is connected to the packet switch 11. The retrieval order management table 125 is connected to a control terminal 13.

The control terminal 13 changes a content of the retrieval order management table 125. The control terminal 13 is a general personal computer having a data communication function.

The retrieval order management table 125 indicates a retrieval order (priority) of a retrieval table for each group. The address retrieving unit 124 carries out a retrieval from a table having a high priority. The priority is set in accordance with an information inputted from the control terminal 13. The retrieval order management table 125 stores therein the information of the input priority.

The packet assembler 121 assembles a disassembled input packet. If the packet switch 11 is an ATM switch, the packet assembler 121 receives a packet data in which channels are multiplexed. The packet assembler 121 assembles the packet by referring to an ATM cell, for each connection. The packet assembler 121 extracts the packet data and the group identification flag from the assembled packet. The packet data and the group identification flag are transferred to the packet accumulator 122. The packet assembler 121 reports to the address extracting unit 123 a timing when the data is transferred to the packet accumulator 122.

The packet accumulator 122 is a memory circuit for transiently storing the packet data and the group identification flag. The packet accumulator 122 stores the content until the completion of the routing process to the input packet and the process of sending out the packet.

FIG. 4 shows the retrieval order management table according to the present invention. The retrieval order management table 125 stores a retrieval order for each group indicated by the group identification flag. In a case of a group 1, a retrieval order of the retrieval table is Table 3-1-2-4. Groups 2, 3 refer to only a retrieval table 2. These groups are a virtual private network different from the other groups.

Each of the retrieval tables 126-1 to 126-n for each group is composed of an entry section storing a transfer destination information corresponding to the destination address and a pointer information establishing a tree structure of the transfer destination information.

The content of the retrieval table is set on the basis of information collected through a routing protocol, such as RIP (Routing Information Protocol), OSIF (Open Shortest Path First), BGP-4 (Border Gateway Protocol) and the like, and a software within the router.

The routing flag adder 127 reads out the packet data from the packet accumulator 122. The routing flag adder 127 adds the routing flag to the packet data, in accordance with the retrieval result. The routing flag adder 127 sends out the packet data to the packet switch 11.

The control terminal 13 is a terminal to establish and input the content of the retrieval order management table 125. The control terminal 13 is constituted by a personal computer or a workstation.

Each of the line interface sections 10-1 to 10-n transfers the received packet to the packet switch 11. The packet has the group identification flag and the routing flag.

The packet switch 11 transfers the packet to the routing processor 12. The content indicative of the routing processor 12 is set for the routing flag of the packet.

The routing processor 12 assembles the input packet. The routing processor 12 writes the packet data and the group identification flag to the packet accumulator 122. The address extracting unit 123 extracts the destination address and reads out the group identification flag. The address retrieving unit 124 uses the destination address as the retrieval key and then executes the address retrieval.

The address retrieving unit 124 refers to the retrieval order management table 125. The address retrieving unit 124 detects the retrieval order (priority) of the retrieval tables 126-1 to 126-n. The address retrieving unit 124 retrieves the retrieval table, in accordance with the priority.

The routing flag adder 127 adds the routing flag to the packet data, in accordance with the retrieved result. The routing flag adder 127 outputs the packet data to the packet switch 11.

The packet switch 11 outputs the packet to the line interface section indicated by the routing flag. The line interface section transmits the packet to the line.

FIG. 5 shows another configuration of a router according to the present invention. A router 3 shown in FIG. 5 has a single line interface section 31-1. The line interface section 31-1 is composed of a line end 311, a flag adder 312 and a routing processor 313.

FIG. 6 shows another configuration of a routing processor according to the present invention. The routing processor 12 shown in FIG. 6 has a table hit counter 128.

The table hit counter 128 monitors each retrieval hit situation of the retrieval tables 126-1 to 126-n. The retrieval order management table 125 is updated in accordance with the monitored result by the table hit counter 128. A priority of a table having a high hit rate is made higher. A priority of a table having a low hit rate is made lower.

In the configuration shown in FIG. 6, the priority of the table is changed on the basis of the hit rate. If a priority of a table having a high reference frequency is made higher, it is possible to shorten a time necessary for the retrieval of the table. The change of the priority can improve a retrieval efficiency of a group having a large amount of traffic.

Advantageous Effects of the Invention

As a first effect of the present invention, it is possible to improve a retrieval speed of a group (destination) having a large amount of traffic.

As a second effect of the present invention, it is possible to reduce the packets staying in the router. The reduction of the staying packets enables a buffer of the router to be decreased.

As a third effect of the present invention, the content of the retrieval order management table can be updated in accordance with the hit frequency of the retrieval table. The update enables the change of the traffic amount to be reflected on the priority of the table. If the priority is changed, the retrieval is carried out from a table having a high reference frequency.

As a fourth effect of the present invention, the retrieval order of the retrieval table can be changed for each group. A filtering process of the table can be attained for each group.

As a fifth effect of the present invention, the tables can be grouped. Due to this grouping, admission information or code information to specify a table is not needed. If a table represents a virtual private network, admission information or code information to specify the virtual private network is not needed.

What is claimed is:

1. A table data retrieving apparatus comprising:
    a plurality of tables in each of which a reference data is stored, wherein each of said plurality of tables is allocated into one or more groups of a plurality of groups;
    a management table storing a priority of said each table; and
    a data retrieving section selecting one of said plurality of groups based on a retrieving key by which said reference data is selected, and referring to said management table to retrieve said allocated table with the highest priority from said selected group.

2. A table data retrieving apparatus as claimed in claim 1, further comprising:
    a counter counting a retrieving hit-value when said data retrieving section retrieves said table, and
    wherein said data retrieving section changing said priority of said each table based on said retrieving hit-value.

3. A router comprising:
    a communication interface connected with a plurality of communication lines for transmitting communication data;
    a plurality of tables storing transmission addresses of said communication data; each table of said plurality of tables is allocated into any group of a plurality of groups;
    a management table storing a priority data of said each table; and
    an address retrieving section selecting a group based on the retrieving key for selecting the reference data as a selected group, and retrieving said table with said priority from a selected group.

4. A router as claimed in claim 3, wherein said selected group corresponds with one of said plurality of communication lines.

5. A router as claimed in claim 3, further comprising:
    a packet receiver receiving packets as said communication data each of which has a group discrimination flag for discriminating said any group and a destination address for transmitting any packet of said packets; and
    a routing controller discriminating a receiver of said destination address from said received packet, and
    wherein said address retrieving section selecting said any group based on said group destination flag of said any packet and retrieving said selected retrieved table based on said destination address of said any packet.

6. A router as claimed in claim 3, wherein said routing controller replaces said destination address by said transmission address which is read from said retrieved table.

7. A router as claimed in claim 3, wherein said communication interface comprises:
   a terminator for terminating said communication data, and
   a flag setting section setting a group destination flag into a communication data for transmission.

8. A router as claimed in claim 5, wherein said routing controller includes a counter for counting a hit-value of said retrieved table, and said routing controller changes said priority of said retrieved table based on said hit-value.

9. A router as claimed in claim 3, wherein said communication data is a packet having a plurality of cells.

10. A method of retrieving table data, comprising:
    allocating a plurality of tables into any group of a plurality of groups, each table having a reference data;
    providing a management table having a priority of each of said plurality of tables;
    retrieving a retrieved group from said plurality of groups based on a retrieving key for retrieving said reference data of a target table of one of said plurality of tables; and
    retrieving said target table with said priority from said retrieved group based on said retrieving key.

11. A method of retrieving table data as claimed in claim 10, further comprising:
    counting said hit-value of a retrieved table, and
    changing said priority of said retrieved table based on said hit-value.

12. A method of retrieving table data as claimed in claim 10, further comprising:
    receiving communication data which has a group discrimination flag for discriminating said any group and a destination address for transmitting said communication data, and
    discriminating said retrieving group based on said group discrimination flag.

13. A method of retrieving table data as claimed in claim 12, further comprising:
    providing transmission addresses of said communication data into said plurality of tables;
    discriminating a transmission address from said transmission address based on said retrieving key as a discriminated transmission address; and
    replacing said destination address of said communication data by said discriminated transmission address.

* * * * *